US007080246B2

(12) United States Patent
Rothman et al.

(10) Patent No.: US 7,080,246 B2
(45) Date of Patent: Jul. 18, 2006

(54) FIRMWARE OVERRIDE HANDLING SYSTEM WITH DEFAULT SELECTION OF A PLATFORM SPECIFIC GROUP OR A CUSTOMIZED GROUP OF HARDWARE SETTINGS

(75) Inventors: Michael A. Rothman, Gig Harbor, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 567 days.

(21) Appl. No.: 10/315,891

(22) Filed: Dec. 9, 2002

(65) Prior Publication Data

US 2004/0111597 A1 Jun. 10, 2004

(51) Int. Cl.
*G06F 9/24* (2006.01)

(52) U.S. Cl. .......................................... 713/2; 713/100
(58) Field of Classification Search ..................... 713/2
See application file for complete search history.

(56) References Cited

U.S. PATENT DOCUMENTS 5,938,764 A * 8/1999 Klein ............................ 713/1
5,974,546 A * 10/1999 Anderson ...................... 713/2
6,438,687 B1 * 8/2002 Klein ............................ 713/1

* cited by examiner

*Primary Examiner*—Thomas Lee
*Assistant Examiner*—Albert Wang
(74) *Attorney, Agent, or Firm*—Justin B. Scout

(57) ABSTRACT

The present disclosure relates to allowing the utilization of an override group of hardware settings and, more particularly, to allowing the utilization of a customized group of hardware settings without the modification of a platform group of hardware settings.

22 Claims, 2 Drawing Sheets

FIRMWARE OVERRIDE HANDLING SYSTEM WITH DEFAULT SELECTION OF A PLATFORM SPECIFIC GROUP OR A CUSTOMIZED GROUP OF HARDWARE SETTINGS

BACKGROUND

1. Field

The present disclosure relates to allowing the utilization of an override group of hardware settings and, more particularly, to allowing the utilization of a customized group of hardware settings without the modification of a platform group of hardware settings.

2. Background Information

Typically, the operation of a computer or processing system (hereafter, "computer") may be divided into two stages, pre-boot and runtime. The pre-boot process or phase often comprises starting or resetting a computer. When first turned on (cold boot) or reset/rebooted (warn boot), a computer executes the software that loads and starts the computer's operating system and prepares it for use. Thus, the computer can be said to pull itself up by its own bootstraps. The runtime process or phase often occurs after the pre-boot phase and includes the execution of an operating system and other user applications. The runtime phase is typically the phase that users interact with the computer. Thus, the computer can be said to being running application programs.

During pre-boot, the computer is first powered on and has very limited capabilities because the volatile memory contains random data and no operating system is running. To begin the pre-boot phase, the processor is often reset to a known state and instructions found at a pre-defined location are executed. Traditionally, this pre-defined location was mapped to a non-volatile memory or firmware referred to as a Basic Input/Output System (BIOS). The BIOS often includes several low-level procedures to handle the hardware components that comprise the computer. Traditionally, each hardware component is associated with an individual driver that may allow the hardware device to be configured during the pre-boot phase.

A BIOS typically includes an embedded ROM table with a default hardware configuration setting. Often, the topology of the ROM table is unique to the manufacturer of the specific firmware or BIOS, and editing of the table requires a specialized tool from the BIOS vendor. Alternatively, the default hardware configuration settings may be mapped through a legacy Complementary Metal Oxide Semiconductor (CMOS )map. Once again, the CMOS map is often unique to each BIOS vendor. This uniqueness and reliance on vendor tools makes it difficult to modify the default hardware settings for a computer or platform. In this context, a "platform" is a particular arrangement of hardware components that constitute an embodiment of a hardware system.

Often, original equipment manufacturers (OEMs) and hardware system retailers would like to buy platforms and hardware components from various component manufactures, but still maintain a constant "look-and-feel," or brand, across their product line. Typically, they achieve this goal by having the platform or BIOS vendor write or compile a special BIOS with the desired "look-and-feel."

Even slight modifications to a BIOS can cause compatibility, integrity or security issues. For example, often BIOS firmware is compressed, and cryptographically signed. The firmware may be signed in order to protect it against tampering (i.e., the Chernobyl virus). Because a new BIOS may need to be created every time a new components are added or removed to make a new hardware system. This, typically, entails a large amount of support, validation, and accounting management.

BRIEF DESCRIPTION OF THE DRAWINGS

Subject matter is particularly pointed out and distinctly claimed in the concluding portions of the specification. The disclosed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as to not obscure the disclosed subject matter.

Figure 1:
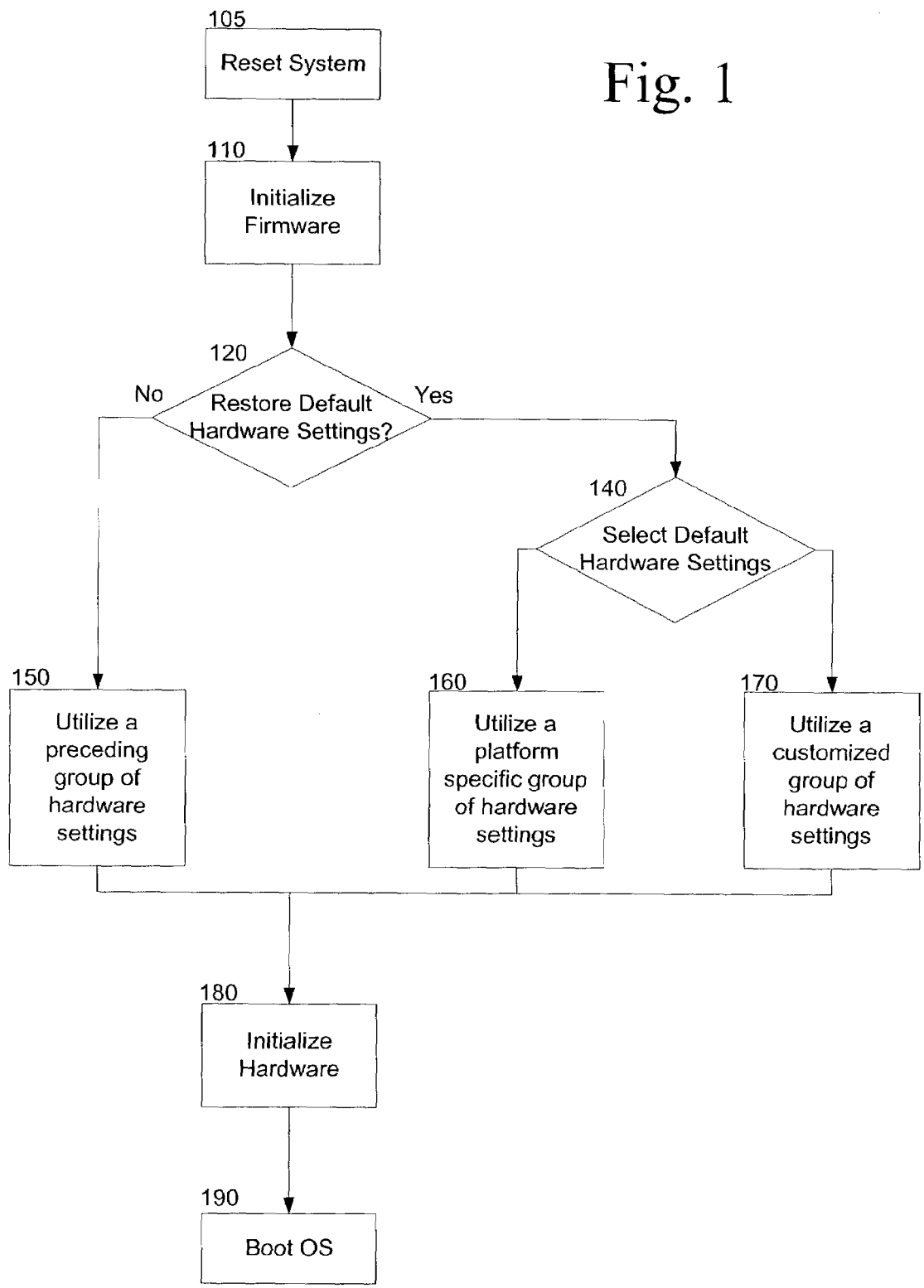
FIG. 1 is a flowchart illustrating an embodiment of a technique for allowing the utilization of an override group of hardware settings in accordance with the disclosed subject matter.

FIG. 1 is a flowchart illustrating an embodiment of a technique for allowing the utilization of an override group of hardware settings in accordance with the disclosed subject matter. In one embodiment, the technique may include block 105 that illustrates that the system may be reset, and block 190 that illustrates the booting of the operating system (OS). In short, it is contemplated that one embodiment of the disclosed subject matter may occur during the pre-boot phase (i.e., between block 105 and block 190). However, the disclosed subject matter is not limited to the pre-boot phase and performing the technique, in whole or part, during the runtime phase is contemplated.

Block 110 illustrates that, in one embodiment, a substantial portion of the pre-boot firmware may initialize and test the integrity of the hardware system. In one embodiment, the hardware system may perform a variation of a power-on self-test (POST) that tests various system components, such as, for example, Random Access Memory (RAM), the disk drives, and the keyboard, to see if they are properly connected and operating. If problems are found, these routines may alert the user by sounding a series of beeps or displaying a message, often accompanied by a diagnostic numeric value, to the standard output or standard error device (usually the screen). In another embodiment, the hardware system may perform actions substantially compliant with those defined in the Extensible Firmware Interface (EFI) specification. Extensible Firmware Interface (EFI) Specification, ver 1.02, Dec. 12, 2000, Intel Corp. (hereafter, "the EFI specification"). However, this is merely one specific embodiment of the disclosed subject matter.

Block 120 illustrates that a decision may be made whether to initialize the hardware system to a default hardware configuration. It is contemplated that a number of activities may elicit a decision to restore the hardware system configuration to a default value. In one embodiment, the hardware system may detect that a number of attempted system boots or initializations has not resulted in a successful hardware system boot. A decision may then be made to attempt to boot the hardware system utilizing a default group of hardware settings. In another embodiment, the system may detect that it has never been booted before, and select the default group of hardware settings. However, these are merely illustrative embodiments and it is contemplated that other activities or conditions, internal or external to the system, may elicit a decision to restore the hardware system configuration to a default value Block 150 illustrates that if the system is not restored to a default setting, a preceding or prior group of hardware settings may be utilized to initialize the hardware system. In one embodiment, this group of settings may have been utilized to successfully boot the hardware system during the preceding or prior boot-up phase. It is contemplated that this group of settings may be stored in the same manner as any default group of settings, described in relation to blocks 160 & 170 below, or stored in a different manner. In one embodiment, a user may configure or manually edit the group of hardware settings.

Block 140, on the other hand, illustrates that if the system is to be initialized utilizing a default group of hardware settings, a particular default group of hardware settings may be selected from a plurality of default groups of hardware settings. In one embodiment, an "Override Variable" may exist that dictates which of the plurality of default groups of hardware settings is to be used. It is contemplated that this variable may be stored or assigned a value utilizing a variety of techniques, such as, for example, hardwired, hardcoded, only editable utilizing a specialized tool, user editable, or dynamically generated based upon the hardware system or groups of settings.

Block 160 illustrates that one of the plurality of groups of hardware settings may include, in one embodiment, a platform specific group of hardware settings. Equipment manufacturers may sell or design a "bare-bones" or standardized hardware system platform. This system may subsequently be expanded or otherwise altered. In this embodiment, the platform specific group of settings may provide settings for such a standardized hardware system platform. Such as group of settings may be a baseline group of settings for the hardware system platform. It is contemplated that, in some embodiments, the standardized hardware system platform need not be a "bare-bones" system and may be quite elaborate.

In one embodiment, the platform specific group of hardware settings may be stored as a compressed and/or cryptographically signed binary image. It is contemplated that the image may not be properly altered without specialized tools. It is contemplated that the cryptographic signature may facilitate the detection of unauthorized alteration of the platform specific group of hardware settings. In one embodiment, the platform specific group of hardware settings may be stored within a non-volatile memory, such as, for example, a firmware. However, it is contemplated that the platform specific group of hardware settings may be stored within or received utilizing other machine accessible media.

In one specific embodiment, the group of hardware settings may include data in an Internal Form Representation (IFR) format. This data may be formatted to include a series of configuration sets. Each configuration set may include an encoded opcode that contains the description of the type of setting and a series of tokenizing strings to enable the creation of human readable questions and possible answers relating to the hardware setting. For example, one embodiment of a configuration set may involve the amount of memory allocated for a hardware component, such as, for example, a video buffer. The configuration set may include an opcode denoting that the configuration has 3 possible options, a question string, such as, "Buffer Size," three option strings, such as, "32MB," "64MB," and "128MB," and a default value representing the "64MB" option. Of course, this is merely one specific embodiment of the disclosed subject matter and other hardware setting or configuration option data and values are contemplated. It is also contemplated that the hardware setting or configuration option data may include a series of sub-sets of string values. Each sub-set may correspond to a different human langue, such as, for example, U.S. English, U.K. English, French, or Chinese. It is contemplated that these various sub-sets may be selected based upon a user or pre-defined global or local setting.

It is contemplated that, in one embodiment, the settings stored in an Internal Form Representation (IFR) or other standardized format may be stored in a format such as, for example, an extensible markup language (XML) format, a hypertext markup language (HTML) format, a compressed binary format, or an encrypted binary format. It is contemplated that the group of hardware settings may be viewable and, in some embodiments, editable, via a runtime application, such as, for example a web browser.

Block 170 illustrates that one of the plurality of groups of hardware settings may include, in one embodiment, a customized group of hardware settings. Equipment manufactures may sell or design a "bare-bones" or standardized hardware system platform. This system may subsequently be expanded or otherwise altered. In one embodiment, a retailer or equipment manufacturer may wish to alter the standardized hardware system in some way. It may be undesirable to alter the platform specific group of hardware settings, illustrated by block 160. Therefore, in this embodiment, a customized group of hardware settings may be used as an alternate group of default hardware settings.

In one embodiment, the customized group of hardware settings may leverage the platform specific group of hardware settings. For example, the customized group may only include a sub-set of the settings found in the platform specific group of hardware settings. This sub-set may be used instead of, or override, the settings found in the platform specific group of hardware settings. It is contemplated that the customized set of hardware settings may include settings not included within the platform specific group of hardware settings. In another embodiment, the customized group of hardware settings may function as a complete alternative to the platform specific group of hardware settings. It is contemplated that, in one embodiment, the customized group of hardware settings may allow a retailer or other manufacturer a technique to maintain a constant "look-and-feel," or brand, across their product line.

In one embodiment, the customized group of hardware settings may be stored in any of the manners and formats described above regarding the platform specific group of hardware settings. It is contemplated that customized group of hardware settings may be stored within the same non-volatile memory as the platform specific group of settings. In one embodiment, the customized group of settings may be appended, either contiguously or continuously, to the platform specific group of settings. Alternately, the customized group of settings may be stored utilizing a separate non-volatile memory. It is contemplated that the non-volatile memory may be one non-volatile memory or a number of separate non-volatile memories each storing the group of hardware settings, in whole or part.

Block 180 illustrates that, once a proper group of hardware settings is selected, the various hardware components of the hardware system may be initialized. It is contemplated that these settings may be written directly to the hardware devices, to a hardware configuration data file or section of memory within the hardware device, to a central database, or to a variety of other locales. It is also contemplated that the new settings may take effect immediately, during a portion of the pre-boot phase, or during the next reset of the system.

Figure 2:
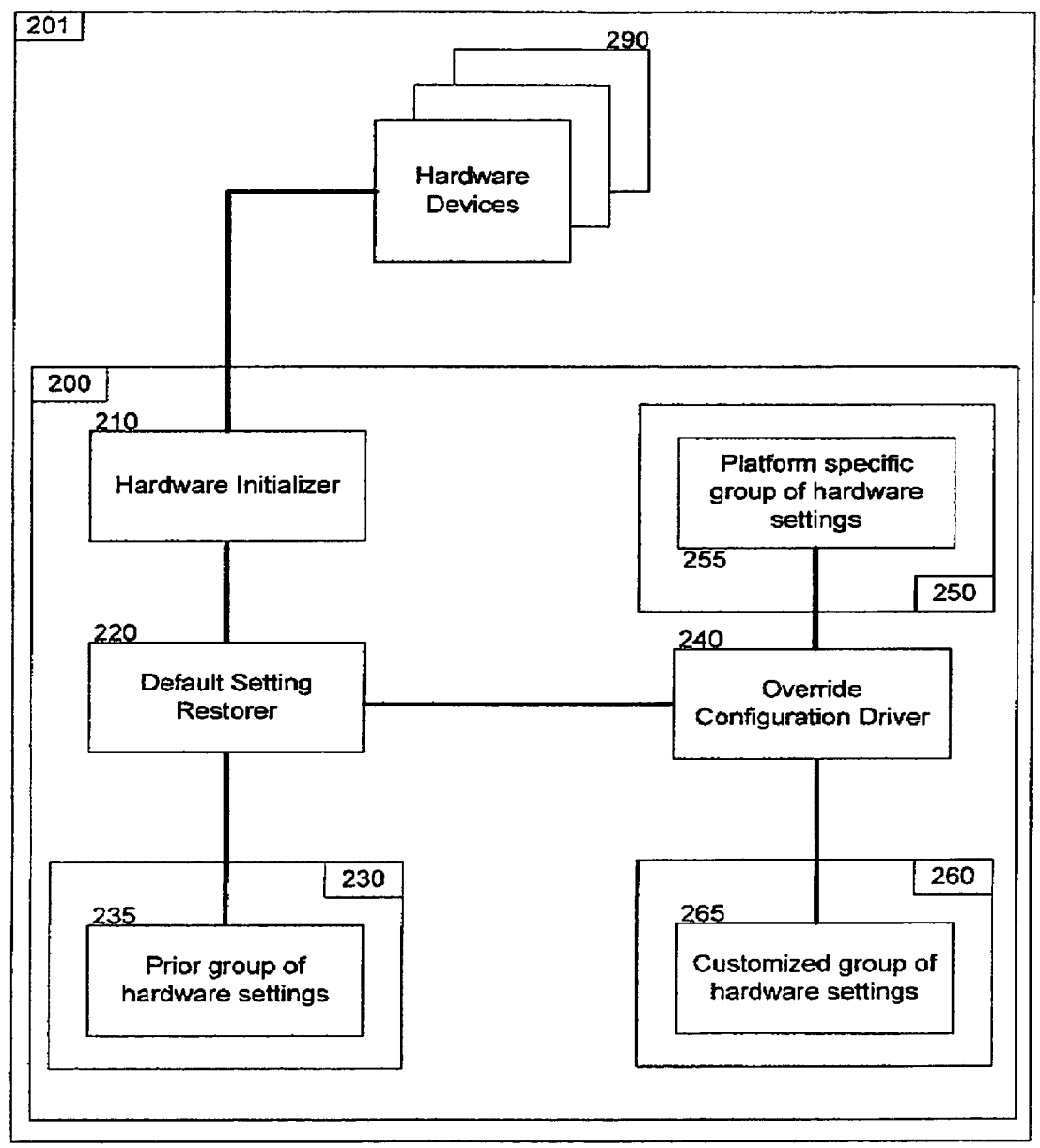
FIG. 2 is a block diagram illustrating an embodiment of an apparatus and a system that allows the utilization of an override group of hardware settings in accordance with the disclosed subject matter.

FIG. 2 is a block diagram illustrating an embodiment of an apparatus 200 and a system 201 that allows the utilization of an override group of hardware settings in accordance with the disclosed subject matter. It is contemplated that an embodiment of such a system may take many forms, such as for example, everything from small handheld electronic devices, such as personal data assistants and cellular phones, to application-specific electronic devices, such as set-top boxes, digital cameras, and other consumer electronics, to medium sized mobile systems such as notebook, sub-notebook, and tablet computers, to desktop systems, workstations, and servers. However, the system is not limited to the forms described above and other forms are contemplated.

In one embodiment, the hardware system 201 may include apparatus 200 and a plurality of hardware devices or components 290 that are capable of being configured with a group of hardware settings. It is contemplated that the hardware system 201 and apparatus 200 may be capable of performing the technique illustrated by FIG. 1 and described above.

In one embodiment, the apparatus 200 may include a hardware initializer 210 to configure a hardware system 201 or a plurality of hardware devices 290 utilizing a group of hardware settings. The apparatus may also include a default setting restorer 220 to determine if a hardware system should be configured utilizing a default group of hardware settings. If not, the hardware initializer may initialize the hardware system utilizing the prior group of hardware settings 235 stored within non-volatile memory 230.

If the system is determined to be initialized using a default group of hardware settings, override configuration driver 240 may select a default group of hardware settings to use from a plurality of hardware settings. One setting may include the platform specific group of settings 255, stored within non-volatile memory 250. Another embodiment may include the customized group of hardware settings 265, stored within non-volatile memory 260. It is contemplated that the override configuration driver may itself be stored within a non-volatile memory.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the disclosed subject matter have been illustrated and described herein, many modifications, substitutions, changes, and equivalents will now occur to those skilled in the art. It is, therefore, to be understood that the appended claims are intended to cover all such modifications and changes that fall within the true spirit of the disclosed subject matter.

What is claimed is:

1. A method comprising:
    determining if a hardware system should be configured to a default group of hardware settings;
    if so, selecting from a plurality of groups of hardware settings stored within at least one non-volatile memory, the plurality having, at least,
        a platform specific group of hardware settings, and
        a customized group of hardware settings;
    reading the selected group of hardware settings from a non-volatile memory; and
    initializing the hardware system according to the read group of hardware settings;
    wherein determining if a hardware system should be configured to a default group of hardware settings includes:
        detecting if a prior boot of the hardware system was successful;
        if not, determining that the hardware system should be configured utilizing the default group of hardware settings; and
    wherein reading the selected group of hardware settings from a non-volatile memory includes:
        reading a group of hardware settings that are stored in an internal form representation format having a series of configuration sets;
        wherein each configuration set facilitates the configuration of at least one hardware setting and includes:
            an encoded opcode to specify what type of hardware selling is being configured; and
            a series of tokenizing strings to facilitate the creation of a human readable question and answer related to the hardware setting.

2. The method of claim 1, wherein reading the selected group of hardware settings from a non-volatile memory includes reading a group of hardware settings that are stored in at least one of the following formats:
    an extensible markup language (XML) format;
    a hypertext markup language (HTML) format;
    a compressed binary format; and
    an encrypted binary format.

3. The method of claim 1, wherein reading the selected group of hardware settings from a non-volatile memory includes
    reading a cryptographically signed and compressed binary image; and
    using a signature of the image to confirm that the image has not been modified after the image was signed.

4. A method comprising:
    determining if a hardware system should he configured to a default group of hardware settings;
    if so, selecting from a plurality of groups of hardware settings stored within at least one non-volatile memory, the plurality having, at least,
        a platform specific group of hardware settings, and
        a customized group of hardware settings;
    reading the selected group of hardware settings from a non-volatile memory; and
    initializing the hardware system according to the read group of hardware settings;
wherein the platform specific and the customized group of hardware settings are stored within one non-volatile memory; and
    the customized group of hardware settings is appended to the platform specific group of hardware settings; and
    wherein when the customized group of hardware settings is selected, reading the selected group of hardware settings from a non-volatile memory includes:
    reading the platform specific group of hardware settings;
    reading the customized group of hardware settings; and
    overriding the platform specific group of hardware settings with the customized group of hardware settings to override.

5. A method comprising:
    determining if a hardware system should be configured to a default group of hardware settings;
    if so, selecting from a plurality of groups of hardware settings stored within at least one non-volatile memory, the plurality having, at least,
        a platform specific group of hardware settings, and
        a customized group of hardware settings;
    reading the selected group of hardware settings from a non-volatile memory; and
    initializing the hardware system according to the read group of hardware settings;
wherein the platform specific and the customized group of hardware settings are stored within one non-volatile memory; and
    the customized group of hardware settings is appended to the platform specific group of hardware settings; and
    wherein the customized group of hardware settings facilitates the marketing of a specific brand of hardware system; and
    the platform specific group of hardware settings facilitates the operation of the hardware system.

6. An apparatus comprising:
    a hardware initializer to configure a hardware system using a group of hardware settings;
    a default setting restorer to determine if a hardware system should be configured utilizing a default group of hardware settings;
    an override configuration driver to select the default group of hardware settings from a plurality of default hardware settings having, at least,
        a platform specific group of hardware settings, and
        a customized group of hardware settings;
    a first non-volatile memory to store the platform specific group of hardware settings; and
    a second non-volatile memory to store the customized group of hardware settings; and
further comprising a non-volatile memory to store a prior group of hardware settings that was utilized during a prior boot of the hardware system; and
    wherein, the default setting restorer is capable of selecting from the prior group of hardware settings and the default group of hardware settings; and
    wherein the default setting restorer is capable of:
    determining if a hardware system should be configured utilizing a default group of hardware settings based, at least in part, upon the success of the prior boot of the hardware system;
    selecting the prior group of hardware settings when the hardware system was successfully booted; and
    selecting the default group of hardware settings when the hardware system was not successfully booted.

7. An apparatus comprising:
    a hardware initializer to configure a hardware system using a group of hardware settings;
    a default setting restorer to determine if a hardware system should be configured utilizing a default group of hardware settings;
    an override configuration driver to select the default group of hardware settings from a plurality of default hardware settings having, at least,
        a platform specific group of hardware settings, and
        a customized group of hardware settings;
    a first non-volatile memory to store the platform specific group of hardware settings; and
    a second non-volatile memory to store the customized group of hardware settings; and
    wherein the plurality of default hardware settings are stored in an internal form representation format having a series of configuration sets;
    wherein each configuration set facilitates the configuration of at least one hardware setting and includes:
    an encoded opcode to specify what type of hardware setting is being configured; and
    a series of tokenizing strings to facilitate the creation of a human readable question and answer related to the hardware setting.

8. The apparatus of claim 7, wherein the plurality of default hardware settings are stored in at least one of the following formats:
    an extensible markup language (XML) format;
    a hypertext markup language (HTML) format;
    a compressed binary format; and
    an encrypted binary format.

9. The apparatus of claim 7, wherein the platform specific and the customized group of hardware settings are stored within the same non-volatile memory; and the customized group of hardware settings is appended to the platform specific group of hardware settings.

10. An apparatus comprising:
    a hardware initializer to configure a hardware system using a group of hardware settings;
    a default setting restorer to determine if a hardware system should be configured utilizing a default group of hardware settings;
    an override configuration driver to select the default group of hardware settings from a plurality of default hardware settings having, at least,
        a platform specific group of hardware settings, and
        a customized group of hardware settings;
    a first non-volatile memory to store the platform specific group of hardware settings; and a second non-volatile memory to store the customized group of hardware settings; and wherein the platform specific group of hardware settings is stored as a cryptographically signed, compressed binary image; and the override configuration driver is capable of checking the signature of the platform specific group of hardware settings to assure that the platform specific group of hardware settings has not been modified.

11. The apparatus of claim 10, wherein the override configuration driver is capable of utilizing a override configuration variable to select the default group of hardware settings; and the value of the override configuration variable cannot be altered.

12. An apparatus comprising:
a hardware initializer to configure a hardware system using a group of hardware settings;
a default setting restorer to determine if a hardware system should be configured utilizing a default group of hardware settings;
an override configuration driver to select the default group of hardware settings from a plurality of default hardware settings having, at least,
a platform specific group of hardware settings, and
a customized group of hardware settings;
a first non-volatile memory to store the platform specific group of hardware settings; and
a second non-volatile memory to store the customized group of hardware settings; and
wherein the customized group of hardware settings facilities that marketing of a specific brand of hardware system.

13. A hardware system comprising:
a plurality of components that are capable of being configured with a group of hardware settings;
an initializer to configure the system using the group of hardware settings;
a default setting restorer to determine if the system should be configured utilizing a default group of hardware settings;
an override configuration driver to select the default group of hardware settings from a plurality of default hardware settings having, at least,
a platform specific group of hardware settings, and
a customized group of hardware settings;
a first non-volatile memory to store the platform specific group of hardware settings; and
a second non-volatile memo to store the customized on of hardware settings; and further comprising a non-volatile memory to store a prior group of hardware settings that was utilized during a prior boot of the hardware system; and
wherein, the default setting restorer is capable of selecting between the prior group of hardware settings and the default group of hardware settings; and
wherein the default setting restorer is capable of:
determining if a hardware system should be configured utilizing a defuult group of hardware settings based, at least in part, upon the success of the prior boot of the hardware system;
selecting the prior group of hardware settings when the hardware system was successfully booted; and
selecting the default group of hardware settings when the hardware system was not successfully booted.

14. A hardware system comprising:
a plurality of components that are capable of being configured with a group of hardware settings;
an initializer to configure the system using the group of hardware settings;
a default setting restorer to determine if the system should be configured utilizing a default group of hardware settings;
an override configuration driver to select the default group of hardware settings from a plurality of default hardware settings having, at least,
a platform specific group of hardware setting, and
a customized group of hardware settings;
a first non-volatile memo to stare the platform specific group of hardware settings; and
a second non-volatile memory to store the customized group of hardware settings; and
wherein the plurality of default hardware settings are stored in an internal form representation format having a series of configuration sets;
wherein each configuration set facilitates the configuration of at least one hardware setting and includes:
an encoded opcode to specify what type of hardware setting is being configured; and
a series of tokenizing strings to facilitate the creation of a human readable question and answer related to the hardware setting.

15. The hardware system of claim 14, wherein the plurality of default hardware settings are stored in at least one of the following formats:
an extensible markup language (XML) format;
a hypertext markup language (HTML) format;
a compressed binary format; and
an encrypted binary format.

16. The hardware system of claim 14, wherein the platform specific and the customized group of hardware settings are stored within the same non-volatile memory; and the customized group of hardware settings is appended to the platform specific group of hardware settings.

17. A hardware system comprising:
a plurality of components that are capable of being configured with a group of hardware settings;
an initializer to configure the system using the group of hardware settings;
a default setting restorer to determine if the system should be configured utilizing a default group of hardware settings;
an override configuration driver to select the default group of hardware settings from a plurality of default hardware settings having, at least,
a platform specific group of hardware settings, and
a customized group of hardware settings;
a first non-volatile memory to store the platform specific group of hardware settings; and
a second non-volatile memory to store the customized group of hardware settings; and
wherein the platform specific group of hardware settings is stored as a cryptographically signed, compressed binary image; and
the override configuration driver is capable of checking the signature of the platform specific group of hardware settings to assure that the platform specific group of hardware settings has not been modified.

18. The hardware system of claim 17, wherein the override configuration driver is capable of utilizing an override configuration variable to select the default group of hardware settings; and the value of the override configuration variable cannot be altered.

19. A hardware system comprising:
a plurality of components that are capable of being configured with a group of hardware settings;
an initializer to configure the system using the group of hardware settings;
a default setting restorer to determine if the system should be configured utilizing a default group of hardware settings;
an override configuration driver to select the default group of hardware settings from a plurality of default hardware settings having, at least,
a platform specific group of hardware settings, and
a customized group of hardware settings;
a first non-volatile memory to store the platform specific group of hardware settings; and
a second non-volatile memory to store the customized group of hardware settings; and
wherein the customized group of hardware settings facilities that marketing of a specific brand of hardware system.

20. An article comprising:
a storage medium having a plurality of machine accessible instructions, wherein when the instructions are executed by a processor, the instructions provide for:
determining if a hardware system should be configured to a default group of hardware settings;
if so, selecting from a plurality of groups of hardware settings stored within at least one non-volatile memory, the plurality having, at least,
a platform specific group of hardware settings, and
a customized group of hardware settings;
reading the selected group of hardware settings from a non-volatile memory; and
initializing the hardware system according to the read group of hardware settings; and
wherein the instructions providing for determining if a hardware system should be configured to a default group of hardware settings includes instructions providing for;
detecting if a prior boot or the hardware system was successful;
if not, determining that the hardware system should be configured utilizing the default group of hardware settings; and
wherein the instructions providing for reading the selected group of hardware settings from a non-volatile memory includes instructions providing for:
reading a group of hardware settings that are stored in an internal form representation format having a series of configuration sets;
wherein each configuration set facilitates the configuration of at least one hardware setting and includes:
an encoded opcode to specify what type of hardware setting is being configured; and
a series of tokenizing strings to facilitate the creation of a human readable question and answer related to the hardware setting.

21. The article of claim 20, wherein the instructions providing for reading the selected group of hardware settings from a non-volatile memory includes instructions providing for reading a group of hardware settings that are stored in at least one of the following formats:
an extensible markup language (XML) format;
a hypertext markup language (HTML) format;
a compressed binary format; and
an encrypted binary format.

22. The article of claim 20, wherein the instructions providing for reading the selected group of hardware settings from a non-volatile memory includes instructions providing for:
reading a cryptographically signed and compressed binary image; and
using a signature of the image to confirm that the image has not been modified after the image was signed.

* * * * *

UNITED STATES PATENT AND TRADEMARK OFFICE
CERTIFICATE OF CORRECTION

PATENT NO. : 7,080,246 B2
APPLICATION NO. : 10/315891
DATED : July 18, 2006
INVENTOR(S) : Rothman et al.

It is certified that error appears in the above-identified patent and that said Letters Patent is hereby corrected as shown below:

In column 1, at line 20, delete "warn" and insert --warm--.

In column 6, at line 56, delete "selling" and insert --setting--.

In column 7, at line 9, delete "he" and insert --be--.

In column 9, at line 48, delete "memo" and insert --memory--.

In column 9, at line 58, delete "defuult" and insert --default--.

In column 10, at line 11, delete "stare" and insert --store--.

In column 11, at line 39, delete ";" and insert --:--.

In column 12, at line 1, delete "or" and insert --of--.

Signed and Sealed this

Twentieth Day of November, 2007

JON W. DUDAS
*Director of the United States Patent and Trademark Office*